United States Patent
Mendonsa et al.

(10) Patent No.: US 11,335,376 B1
(45) Date of Patent: May 17, 2022

(54) DRIVE CONTROLLER-OVERRIDE MECHANISM

(71) Applicant: Seagate Technology LLC, Fremont, CA (US)

(72) Inventors: Riyan Alex Mendonsa, Minneapolis, MN (US); Brett R. Herdendorf, Mound, MN (US); Jon D. Trantham, Chanhassen, MN (US); Kevin Lee Van Pelt, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/161,523

(22) Filed: Jan. 28, 2021

(51) Int. Cl.
  *G11B 5/09* (2006.01)
  *G11B 21/12* (2006.01)
  *G11B 17/022* (2006.01)
  *G11B 5/012* (2006.01)

(52) U.S. Cl.
  CPC ............ *G11B 21/12* (2013.01); *G11B 5/012* (2013.01); *G11B 17/022* (2013.01)

(58) Field of Classification Search
  None
  See application file for complete search history.

(56) References Cited

U.S. PATENT DOCUMENTS

| | | | |
|---|---|---|---|
| 4,357,656 A * | 11/1982 | Saltz | G11C 29/24 711/113 |
| 4,591,982 A * | 5/1986 | Buonomo | G06F 9/26 712/203 |
| 5,280,398 A | 1/1994 | Wade et al. | |
| 5,682,273 A * | 10/1997 | Hetzler | G06F 1/3268 360/75 |
| 6,259,578 B1 * | 7/2001 | Christiansen | G11B 15/6835 360/92.1 |
| 9,146,684 B2 * | 9/2015 | Smith | G06F 3/0685 |
| 9,779,026 B2 * | 10/2017 | Kumar | G06F 16/1827 |
| 10,289,846 B2 * | 5/2019 | Vargas Gonzalez | G06F 21/554 |
| 2002/0141098 A1 * | 10/2002 | Schlager | H02P 25/034 360/75 |
| 2002/0186963 A1 * | 12/2002 | Toyoda | H04N 5/772 386/209 |
| 2004/0264059 A1 * | 12/2004 | Ooi | G11B 5/54 360/264.7 |
| 2007/0073965 A1 * | 3/2007 | Rajakarunanayake | H04N 5/76 711/112 |
| 2009/0282485 A1 * | 11/2009 | Bennett | H04L 63/145 726/24 |
| 2010/0169972 A1 * | 7/2010 | Kuo | G06F 21/564 726/23 |
| 2012/0030415 A1 * | 2/2012 | Selfin | G06F 3/0631 711/103 |
| 2015/0135335 A1 * | 5/2015 | Garimella | G06F 21/34 726/28 |

(Continued)

*Primary Examiner* — Peter Vincent Agustin
(74) *Attorney, Agent, or Firm* — Holzer Patel Drennnan

(57) ABSTRACT

A data storage device includes a primary storage media, a drive storage controller electrically coupled to media recording electronics and a controller-override mechanism. The controller-override mechanism is selectively controllable by a user to override control actions of the drive storage controller to prevent the drive storage controller from altering the primary storage media at a time when the storage device is otherwise configured for nominal data storage operations.

20 Claims, 7 Drawing Sheets

(56) References Cited

U.S. PATENT DOCUMENTS

| | | | | |
|---|---|---|---|---|
| 2015/0301903 | A1* | 10/2015 | Mutha | G06F 11/1453 707/692 |
| 2017/0168902 | A1* | 6/2017 | Branco | G06F 21/74 |
| 2017/0185791 | A1* | 6/2017 | Yamada | G06F 21/52 |
| 2021/0150025 | A1* | 5/2021 | Ben-Shalom | G06F 21/566 |
| 2021/0173930 | A1* | 6/2021 | Dahal | G06N 20/00 |

\* cited by examiner

DRIVE CONTROLLER-OVERRIDE MECHANISM

SUMMARY

As the severity of ransomware attacks by rouge entities increases, so too does the challenge in adequately and dependably protecting user data in storage devices, such as those residing at cloud storage facilities. Often, ransomware is crafted to attack firmware internal to a user data storage device. Should an adversary succeed at installing malicious code in the device, the user (often, a cloud storage provider or cloud storage tenant) needs to find a way to replace the firmware without putting the stored user data at risk. Due to the limited and inadequate remedies offered by currently-available data protection solutions in such scenarios, it is not uncommon for cloud storage providers and cloud storage tenants to cooperate with and pay large sums of money to nefarious actors launching such attacks.

SUMMARY

A data storage device includes a drive storage controller electrically coupled to media recording electronics configured to read data from and write data to a primary storage media. The data storage device further comprises a controller-override mechanism selectively controllable by a user to override control actions of the drive storage controller to prevent the drive storage controller from altering the primary storage media at a time when the storage device is otherwise configured for nominal data storage operations.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

The monetary stakes of some of ransomware attacks have become so lucrative that cloud storage providers and cloud storage tenants actively seek data protection solutions that are externally demonstrable and verifiable, such as "air-gapped" solutions (also referred to herein as "controller-override mechanisms") that function to isolate and protect user data in the event that firmware on a storage device becomes compromised. The herein disclosed technology provides for a number of such air-gapped solutions that primarily function to protect (1) protect user data from the drive's own internal firmware/software in the event that the drive firmware/software becomes compromised while (2) allowing the rightful drive owner or data manager to re-write the compromised firmware/software to the drive while isolating the user data from the drive's read/write control electronics. If, for example, a customer becomes aware that a drive has rogue firmware on it, the customer may wish to replace the firmware without jeopardizing safety of the user data being stored on the media.

The herein proposed solutions provide for various controller-override mechanisms that may be selectably implemented from a location external to the data storage device while the data storage device is otherwise configured for nominal data storage operations. When implemented, the proposed solutions provide for action(s) that physically prevent the drive controller from altering the primary storage media in the drive (e.g., these solutions effectively supersede or "override" media access control operations that may be executed by the compromised drive firmware).

Figure 1:
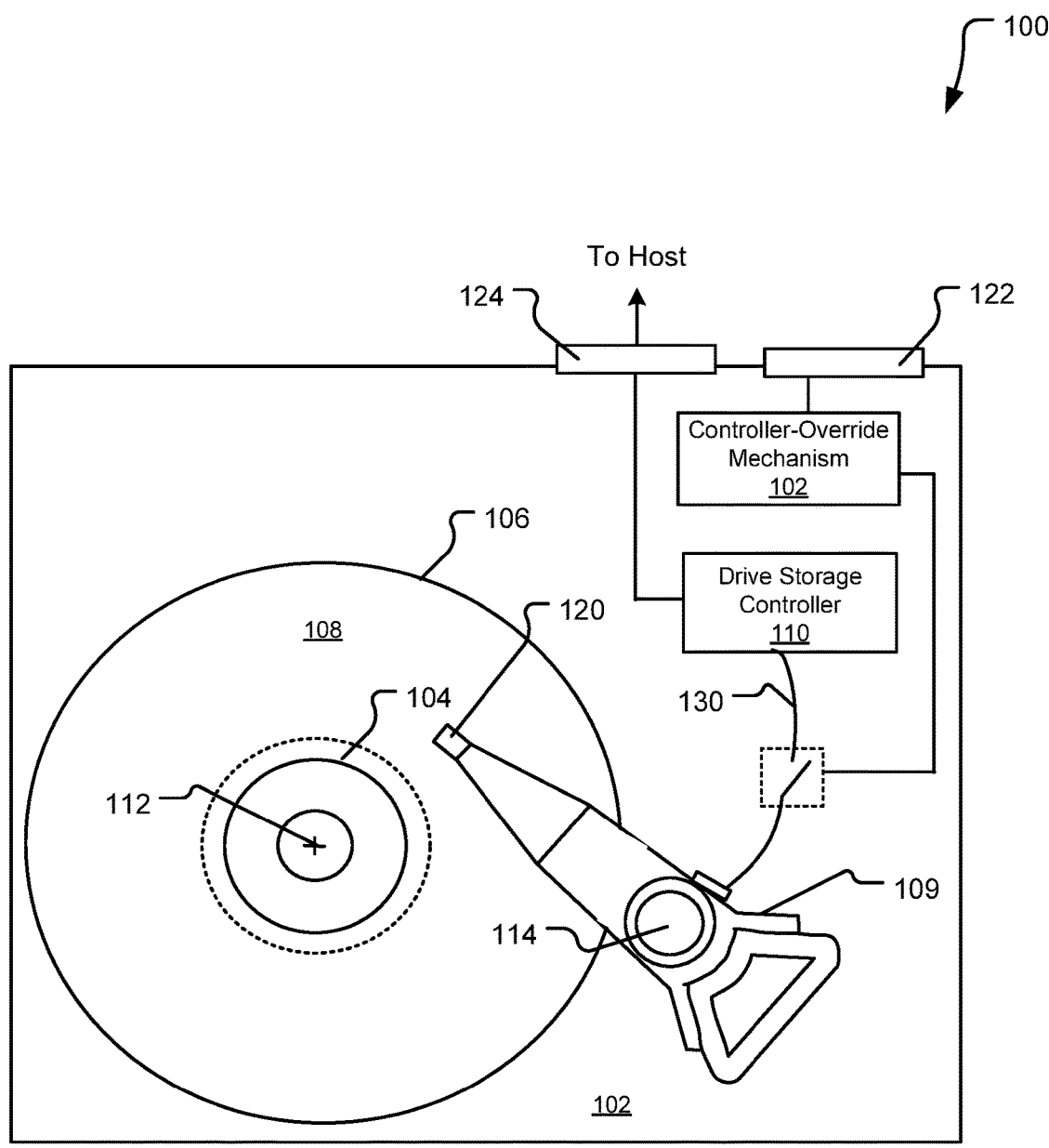
FIG. 1 illustrates an exemplary data storage device with a controller-override mechanism that may be selectively engaged by a user to safe and isolate user data from actions implemented by a drive storage controller of the data storage device.

FIG. 1 illustrates an exemplary data storage device 100 with a controller-override mechanism 102 that may be selectively engaged by a user to isolate and safe user data stored on a primary storage media 108 and from control electronics (e.g., firmware) within the data storage device, such as at times when the control electronics have been seized and/or are suspected of having been modified in a third party attack, such as an attack via ransomware, viruses, or spyware.

Although other implementations are contemplated, the data storage device 100 is shown to be hard drive device (HDD) with a magnetic disk (e.g., the primary storage media 108) on which data bits can be recorded using a magnetic write pole and read from using a magnetoresistive element. The primary storage media 108 rotates about a spindle center or a disc axis of rotation 112 during rotation, and includes an inner diameter 104 and an outer diameter 106 between which are a number of concentric data tracks (not shown). Information may be written to and read from data bit locations in the data tracks on the primary storage media 108 using read/write elements on a transducer head assembly 120, which is mounted on an actuator assembly 109 at an end distal to an actuator axis of rotation 114. The transducer head assembly 120 flies in close proximity above the surface of the primary storage media 108 during disc rotation. The actuator assembly 109 rotates during a seek operation about the actuator axis of rotation 114 to position the transducer head assembly 120 over a target data tracks for read and write operations.

In FIG. 1, the data storage device 100 is shown to include a single disk; however, it is understood that the data storage device 100 may include multiple discs and multiple actuator arms and/or actuator assemblies. In some implementations, the data storage device 100 is a solid state storage device (SSD) that does not include a rotating magnetic media. The data storage device 100 is shown to include a drive storage controller 110, which may be understood as including or consisting of read/write hardware and/or software elements (e.g., firmware) that are internal to and locally installed within the data storage device 100. For example, the drive storage controller 110 may include software or a combination of software and hardware, such as control instructions executed by one or more separate or shared device controllers (e.g., microprocessors), peripheral interface controllers ("PIC s"), application-specific integrated circuits ("ASICs"), systems on chips ("SoCs"), etc.

The drive storage controller 110 is electrically coupled (e.g., by a flex cable 130) to media recording electronics that physically transport read/write signals to the primary storage media 108, such as to one or more drive preamplifiers that transmit read/write signals to and from the transducer head assembly 120. In implementations where the data storage device 100 is a solid state device, the drive storage controller 110 transports signals to media recording electronics that include one or more flash chips the execute read and write operations.

By example and without limitation, the controller-override mechanism 102 is, in FIG. 1, shown to be a switch that selectively interrupts signals flowing between the drive storage controller 110 and media recording electronics (e.g., preamplifiers on the actuator assembly 109, heads on the transducer head assembly 120, voice coil and spindle motors, etc.). This depiction of the controller-override mechanism 102 is intended as one non-limiting example, and it should be understood that the controller-override mechanism 102 may assume a wide variety of physical forms in different implementations.

In various implementations, including those discussed in detail with respect to FIG. 2-6 below, the controller-override mechanism 102 is selectably controllable from a location external to the data storage device 100 and that is implemented along channels that bypass the drive storage controller 110 (e.g., the drive storage controller 110 has no access to or awareness of the channels). That is, the controller-override mechanism 102 is not to be interpreted as conveying or transmitting any type of instructions to the drive storage controller 110, but instead, as using independent communication channel(s) to transmit signals effective to inhibit or supersede actions that the drive storage controller 110 may attempt to carry out.

In one implementation, the controller-override mechanism 102 is selectably controllable by a user (e.g., a device owner or rightful data manager) to override actions of the drive storage controller 110 to prevent the drive storage controller 110 from altering data on the primary storage media 108 at a time when the data storage device 100 is otherwise configured for nominal data storage operations. For example, the controller-override mechanism 102 may be selectably engaged by a user to override an action of the drive storage controller 110 at a time when the data storage device 100 is actively receiving and executing read and write operations from a host device (not shown).

In different implementations, the controller-override mechanism 102 may assume a variety of different forms including, without limitation, that of one or more signals effective to terminate power flow to select media recording electronics and/or to inhibit, disable, short-out or otherwise interrupt signals in route between the drive storage controller 110 and the media recording electronics. Although not necessary to implementation, the specific examples provided herein also provide for activation of the controller-override mechanism 102 through channels that do not receive or transmit user data storage and retrieval command signals to an external host. For example, the data storage device 100 may include a controller-override input interface 122 (e.g., one or more ports or signal feeds) separate from those that interface with a host (e.g., a host interface 124) for general device operation. In one implementation, the controller-override input interface 122 is not accessible to entities external to the data storage facility where the data storage device 100 is stored. For example, the inputs to the controller-override input interface 122 may be locally-originating electrical or mechanical inputs, such as inputs originating at a rack or a chassis-level controller or inputs originating at the data storage device 100 itself, such as when a user performs a manual action. For example, the data storage device 100 may self-generate inputs to the controller-override mechanism 102 when a user flips a switch, turns a knob, inserts a key, or performs other manual action in physical proximity to the device. In an alternate implementation, the controller-override input interface 122 is accessible external to the rack or chassis, but under separate control from data storage and retrieval, such as through a separate sidechannel interface, such as an Ethernet interface. This interface may be physically or virtually on a separate network from the network used with host interface 124 in order to isolate the override feature, for example, should the main data storage network be compromised.

In one implementation, a user performs a manual action to selectively engage the controller-override mechanism 102 responsive to receiving an indication that the data storage device 100 or its host has been victim to a malware attack. For example, a manager of the data storage device 100 may notice that certain user data is not accessible, firmware is not behaving as accepted, certain errors may occur, suspicious network activity, and/or an operator may receive a ransomware message at a system display. In response to any of these or other scenarios, a user may selectively engage the controller-override mechanism 102, such as by walking to a physical location of the data storage device 100 and perform manual action or by invoking it via a side network as described above. For example, the user may provide an input signal to the controller-override input interface 122 with a hand-held electronic device, or perform a manual action (e.g., flip a switch, turn a knob, insert a key) on the data storage device 100 or chassis storing the data storage device to cause the data storage device 100 to generate input/signals sufficient to selectively engage the controller-override mechanism 102.

The drive storage controller 110 may comprise software, hardware, or a combination of hardware and software, where software may be understood as including computer-executable instructions stored in memory. Likewise, the controller-override mechanism 102 may comprise pure hardware or a combination of hardware and software. The interface to controller-override mechanism 102 can be simple discrete signals, or a more sophisticated communication interface, such as I2C or a serial interface. For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, operating systems, applications, and the like that are accessed by a computer processor to perform the desired functionality. The term "memory" is defined herein to expressly exclude transitory computer-readable communication signals that embody computer readable instructions, data structures, program modules or other data resident in a modulated data signal, such as a carrier wave or other signal transport mechanism.

Figure 2:
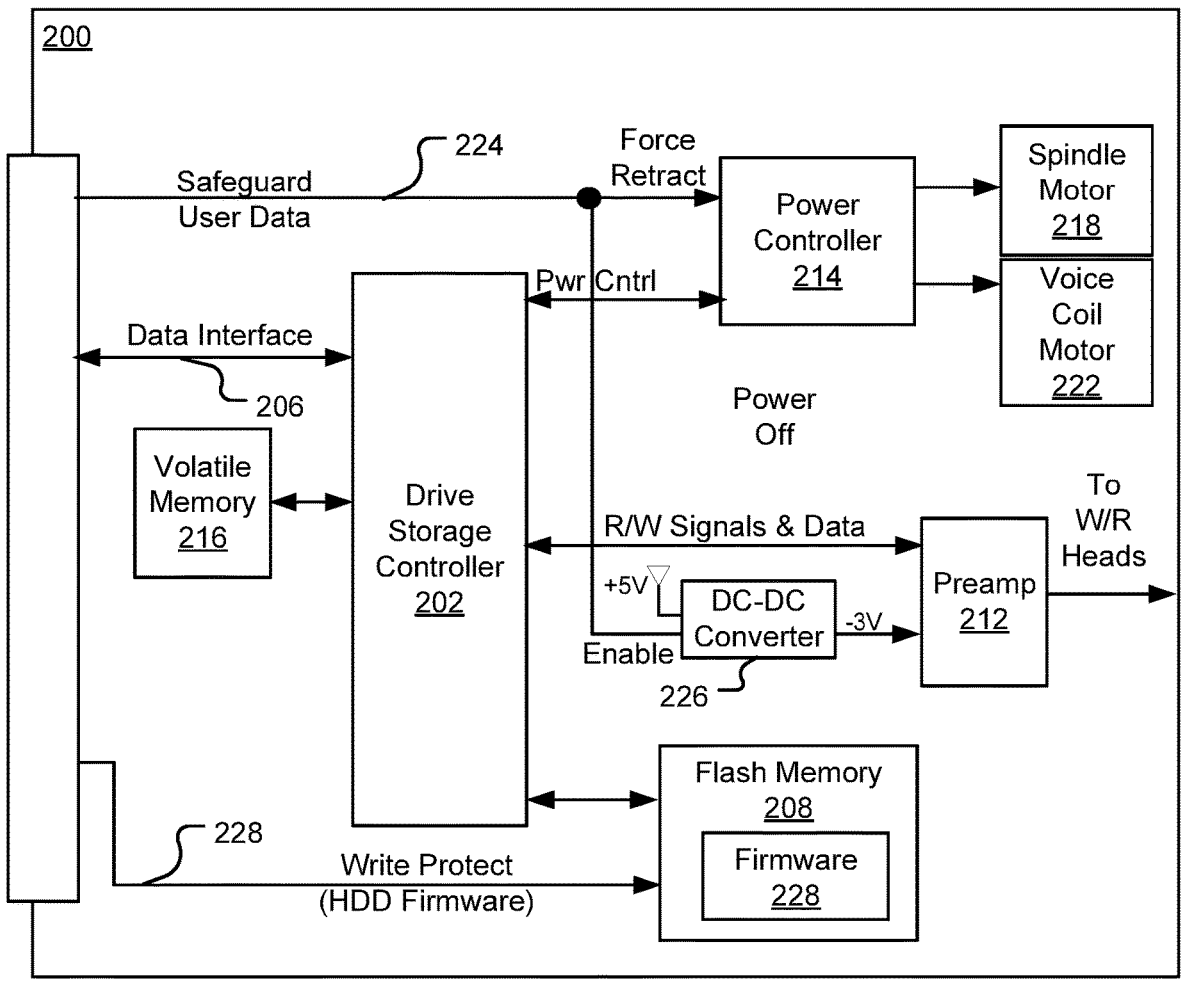
FIG. 2 illustrates another exemplary data storage device with various controller-override mechanisms designed to safeguard user data from actions implemented by a drive storage controller of the data storage device, such as when the drive storage controller has been infiltrated by ransomware.

FIG. 2 illustrates another exemplary data storage device 200 with various controller-override mechanisms designed to safeguard user data from actions implemented by a drive storage controller 202 of the data storage device 200, such as when the drive storage controller 202 or its host have been infiltrated by malware (e.g., ransomware). By example and without limitation, the data storage device 200 is shown to be an hard drive assembly (HDA). The drive storage controller 202 receives host-initiated read and write commands received across a data interface 206 and generates control signals for writing data to and reading data from a primary storage media (e.g., a magnetic disk, not shown) using read/write heads. When in route to and from the primary storage media, the generated read and write signals are amplified by a preamplifier 212, which may, for example, be coupled to or positioned on an actuator assembly of the data storage device 200. The preamplifier 212 is, for example, a chip configured to control voltages and currents applied to the recording heads.

Although the data storage device 200 may include different components in different implementations, the data storage device 200 of FIG. 2 includes a power motor controller 214 that generates power control signals for controlling both a spindle motor 218 and a voice coil motor 222 responsive to receipt of power control signals from the drive storage controller 202. Additionally, the data storage device 200 includes volatile memory 216 (e.g., DRAM), and non-volatile memory 208 (such as NOR flash) storing firmware 228 that is accessed and executed by the drive storage controller 202.

In addition to read/write signals received across the data interface 206, the data storage device 200 includes additional side-channels (e.g., 224, 228) that are designed to safeguard both user data on the primary storage media as well as the integrity of the firmware in the flash memory 208. When a safeguard user data signal is asserted along a side-channel 224, the signal functions to selectably disable or interrupt control of certain media recording electronics to prevent the drive storage controller 202 from performing actions that may jeopardize the safety of user data stored on the primary storage media (e.g., the disk) or the safety of the device in general. For example, security-compromised firmware may be maliciously controlled to send unsafe currents through fragile head components or slam read and write heads into the storage media, inflicting damage. These and other harmful control actions are prevented when the safeguard user data signal is asserted.

The side-channel 224 is shown to bypass the drive storage controller 202 and to provide the safeguard user data signal to both the power controller 214 and the preamplifier 212. In other implementation, the side-channel 224 may provide the safeguard user data signal to one rather than both of the power controller 214 and the preamplifier 212. When asserted, the safeguard user data signal functions as a "force retract" input that causes the voice coil motor to safely park the read/write heads, such as on a mechanical ramp and then to shut off the spindle motor. In various implementations, the force retract input may be an electrical ground or an electrical current.

In the illustrated implementation, the side-channel 224 also provides the safeguard user data signal to the preamplifier 212. Within the preamplifier 212, the safeguard user data signal functions as a "power off" input. For example, power inputs to the preamplifier 212 may be normally supplied via a discrete voltage regulator (e.g., DC-DC converter 226) with an enable signal that, when grounded, powers down the preamplifier 212, shutting off bias voltages and currents to the recording heads. In other implementations, shut-down of the preamplifier 212 is achieved via a non-grounded electrical input signal along the side-channel 224.

Assertion of the safeguard user data signal along the side-channel 224 is effective to permit the firmware of the data storage device 200 to be updated while the firmware is also prevented from accessing the primary storage media due to the parking of the heads and the termination of power to the spindle motor 218 and preamplifier 212. This has the effect of protecting user data on the primary storage media from obliteration, alteration, and overwrite until the firmware can be updated to overwrite/correct maliciously corrupted code.

The data storage device 200 additionally includes a write protection mechanism designed to prevent firmware corruption or overwrite. Specifically, the write protection mechanism includes another side-channel 228 usable to selectively assert a "write protect" signal. When asserted, the Write Protect signal prevents writing or erasing of data within the flash memory 208. For example, the flash memory 208 may be a serial NOR flash chip that has a firmware write protect input signal that, when grounded, prevents writing or erasing of data within the flash memory 208. In one implementation, the Write Protect signal is asserted via the side-channel 228 throughout execution of nominal read and write operations, being unasserted at times when the firmware is being updated by the data manager or owner.

The signals independently transmitted via the side-channels 224, 228 represent exemplary controller-override mechanisms that may, in different implementations, provide respective security advantages via independent or joint assertion.

Notably, the data storage device 200 may be positioned in a chassis, rack, or other storage library configuration that is adapted for local provisioning of the signals that are asserted along the side-channels 224, 228. In one implementation, the side-channels 224, 228 are not connected to the host device (e.g., the device providing read/write commands over the data interface 206) or to any non-local network or other processing devices external to the facility where the data storage device 200 physically resides. For example, a user may perform a physical action, such as by inserting a key, flipping a switch, coupling a handheld mobile device to an input port, etc., to assert signals along these lines.

Figure 3:
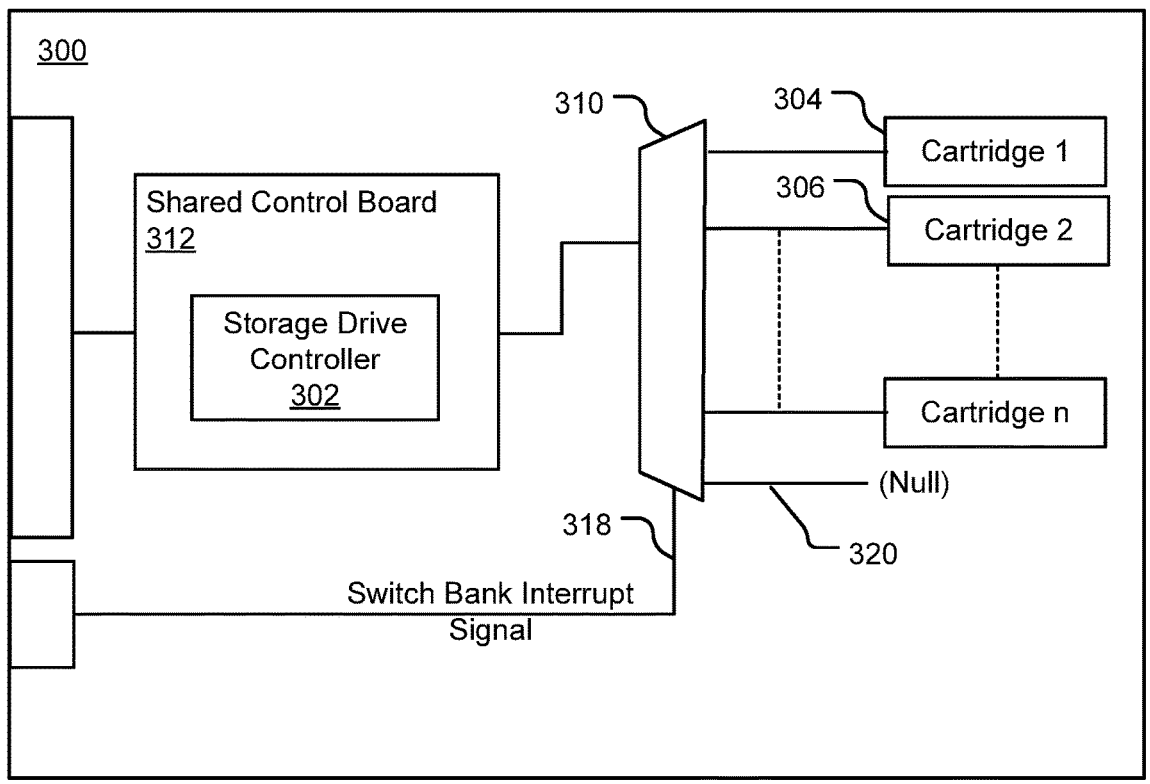
FIG. 3 illustrates another exemplary data storage device with various controller-override mechanisms designed to safeguard user data from a drive storage controller that has fallen under the control of a rogue entity.

FIG. 3 illustrates another exemplary data storage device 300 with various controller-override mechanisms designed to safeguard user data from a drive storage controller 302 that has fallen under the control of a rogue entity (e.g., in a malware attack). The data storage device 300 includes several different storage cartridges (e.g., cartridges 304, 306) that may each be understood as including one or more storage media but lacking read/write control electronics incorporated in a traditional storage drive controller printed circuit board. The read/write control electronics have, in the illustrated implementation, been displaced from respective positions inside of the individual cartridges to a position on a shared control board 312 that supports a set of control electronics shared by all of the storage cartridges. The various storage cartridges discussed herein may, for example, generally assume the form of an HDD minus control electronics and, in some cases, other elements that can be offloaded from the cartridge and supplied by, such as VCM magnets and spindle motor components. The removal of these elements from the individual cartridges in the library allows the provisioning of a large-scale, high-capacity storage system with the benefits of magnetic disc storage at a significantly lower cost.

By example and without limitation, the exemplary storage cartridges 304, 306 may therefore each resemble a conventional hard drive disk (HDD), but lack certain mechanical and electrical features that would otherwise be necessary to enable the cartridge to operate in a stand-alone fashion. For example, the cartridges may lack an SOC or ASIC that carries out read and write operations. These components may be understood as being included within a shared storage drive controller 302 that is on the shared control board 312 and coupled to each of the storage cartridges via a switch bank 310 (e.g., multiplexor).

Although not explicitly shown, the shared control board 312 may be understood as further including one or more of a power circuit, volatile memory (e.g., DRAM), and non-volatile memory (e.g., Flash). In one implementation, the storage drive controller 302 includes a programmable processing core that utilizes firmware stored in the flash memory and volatile memory to provide top-level control for each of the storage cartridges. In some implementations, the storage cartridges may be portable and designed to removably couple to the switch bank 310 via an interconnect.

In addition to those components discussed above, FIG. 3 further includes a controller-override mechanism, which assumes the form of one or more discrete signals referred to herein as a switch bank interrupt signal 318 that serves to disable the switch bank 310 and thereby interrupt signals in route between the storage drive controller 302 and the various storage cartridges 304, 306, etc.

In one implementation, the switch bank interrupt signal 318 is asserted via a communication channel that bypasses the storage drive controller 302. By example and without limitation, the switch bank interrupt signal 318 is shown providing an input to the switch bank 310 that interrupts signal(s) in route between the storage drive controller 302 and the various cartridges 304, 306, etc. In one implementation, the switch bank interrupt signal 318 controls the switch bank 310 to select a null output destination 320 for the signals flowing from the drive storage controller 302.

In the illustrated implementation, the switch interrupt signal 318 is asserted from a location external to the data storage device 300 that is not accessible to a host device sending read and write commands to the data storage device 300. For example, the switch interrupt signals 318 may be asserted locally via an input port to a chassis or rack including the storage device 300.

Figure 4:
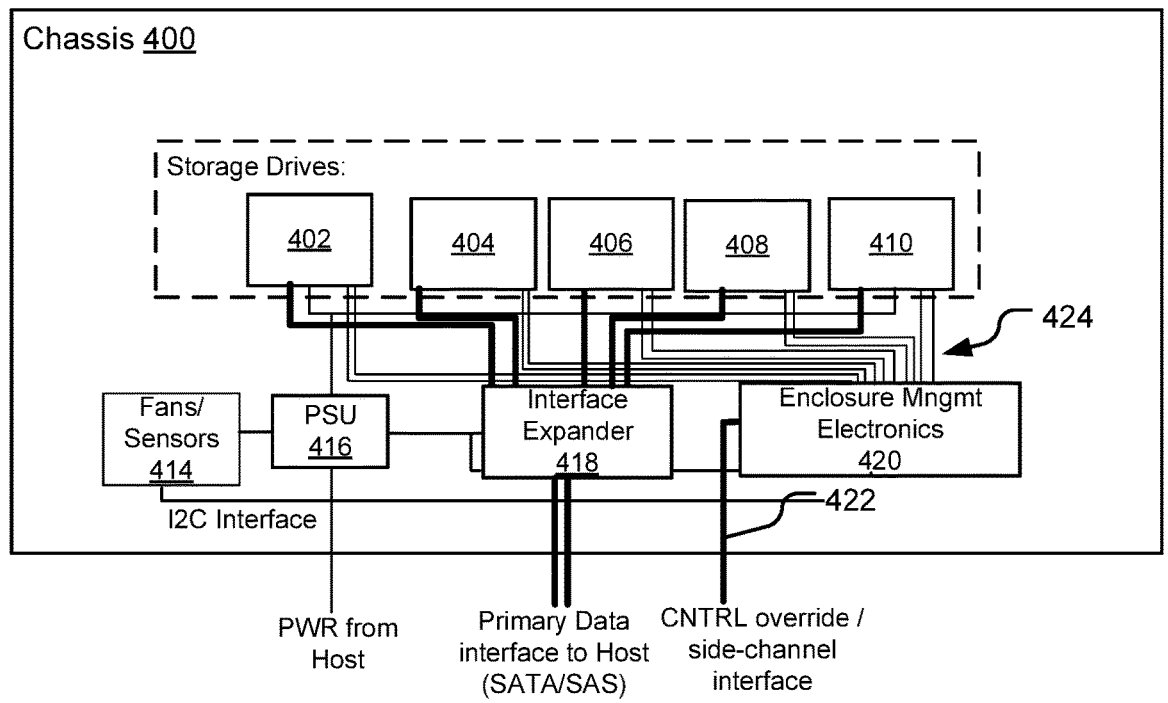
FIG. 4 illustrates a library-type storage system including a chassis that houses a number of storage drives and that includes a side-channel input interface for conveying signal inputs that may serve to override or otherwise prevent execution of firmware commands within each of a number of storage drives.

FIG. 4 illustrates a library-type storage system, such as a storage array or a server, including a chassis 400 that houses a number of storage drives 402, 404, 406, 408, 410 and that includes a side-channel interface 422 for conveying signal inputs that may serve to override or otherwise prevent execution of firmware commands within each of a number of storage drives 402, 404, 406, 408, 410.

In the illustrated chassis 400, it is assumed that a storage drive controller (not shown) is integrated within each one of the storage drives 402, 404, 406, 408, 410, as shown above, and that the storage drive controller executes firmware to read/write to media of the associated drive during nominal storage operations. The storage drives 402, 404, 406, 408, 410 may be the same or different types of storage devices including and may, for example, include one or more HDD, SDDs, or bulk storage devices such as the device 300 in FIG. 3 (e.g., with multiple media controlled by a shared drive storage controller). The storage drives 402, 404, 406, 408, 410 are arranged in a same rack or chassis that houses fans and temperature sensors 414 and at least one power supply unit (PSU 416) that receives power from an external host. Additionally, the chassis 400 includes an interface expander 418 for conveying data signals to and from a host interface. For example, the interface expander may be a SATA or SAS expander or switch.

In addition to the foregoing, the chassis 400 includes enclosure management electronics 420 that receive inputs from the side-channel interface 422 and, in turn, that provide such inputs to a side-channel network 424. In one implementation, the side-channel network 424 includes interfaces, transmission lines(s), or discrete signals that are each coupled to corresponding interfaces, transmission line(s), or discrete signals within an associated one of the drives 402, 404, 406, 408, and 410. These controls bypass read/write control electronics of the drive while carrying the associated signal(s) to a respective designation within the drive's media recording electronics.

Stated differently, the interfaces, transmission lines, or discrete signals within the side-channel network 424 couple to drive-level transmission lines that are completely independent of the data channels used to convey read/write data and signals (e.g., those coupled to the interface expander 418). For example, the side-channel interface 422 may be usable to convey the exemplary "Safeguard User Data" or "Write Protect" signals shown and described with respect to FIG. 2 and/or the "Switchbank Interrupt Signals" shown and described with respect to FIG. 3. Inputs provided to the side-channel interface 422 are conveyed to enclosure management electronics 420 which, in turn, relay the signals to the storage drives 402, 404, 406, 408, 410, and 412 using the side-channel network 424.

The enclosure management electronics 420 may include various components such as one or more multiplexors and/or driver circuits for converting signals received along the side-channel interface 422 to input form(s) compatible with each of the storage drives 402, 404, 406, 408, 410. In different implementations, a user may provide inputs to the side-channel interface 422 in different ways including, for example, by flipping a switch on the chassis 400, turning a knob on the chassis 400, inserting a key into the chassis 400, sending a command over interface 422, or by establishing an electrical coupling between one or more ports of the side-channel interface 422 and an alternate electronic device (e.g., a handheld device) that may generate electrical input(s) of appropriate form.

In one implementation, the side-channel interface 422 is designed such that inputs to the interface may exclusively be provided locally—at the location of the chassis 400, guaranteeing maximum security of the drives and the user data stored thereon. In an alternate implementation, the sidechannel interface 422 may be on a separate computer network from the primary data interface, and may be managed away from chassis 400, but still independent of the primary storage network used for general data storage.

Figure 5:
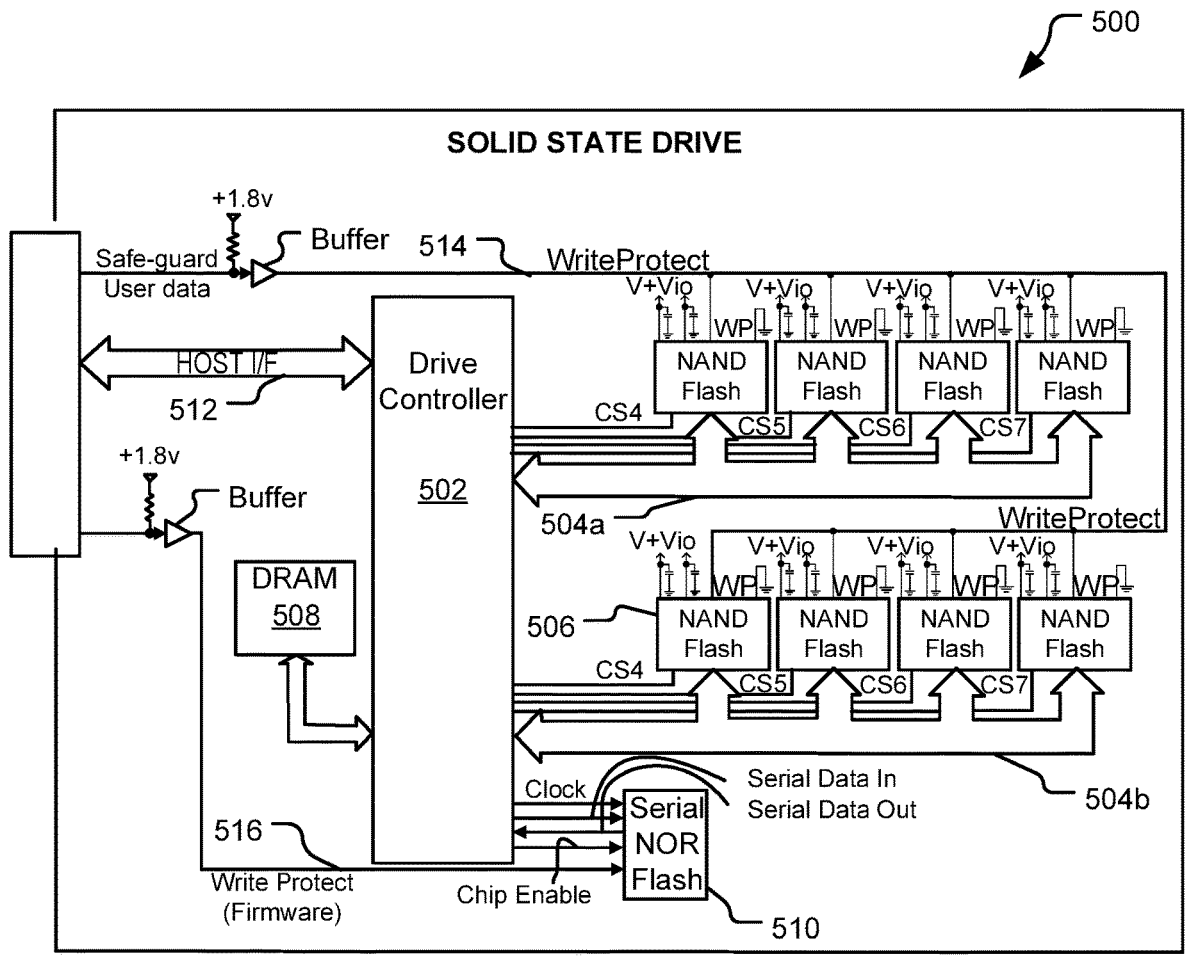
FIG. 5 illustrates another exemplary solid state device (SSD) with various controller-override mechanisms designed to safeguard user data from actions potentially implemented by a drive storage controller that has been victim to a malware attack.

FIG. 5 illustrates another exemplary solid state device (SSD) 500 with various controller-override mechanisms designed to safeguard user data from actions potentially implemented by a drive storage controller 502 that has been victim to a malware attack. By example and without limitation, the drive storage control 502 is shown coupled, via Flash interface buses 504a, 504b, to various NAND chips (e.g., a NAND chip 506) storing user data. The SSD additionally includes volatile memory 508 (e.g., DRAM) and a secondary non-volatile flash memory 510 (e.g., serial NOR Flash) storing firmware that is accessed and executed by the drive storage controller 502.

The drive storage controller 502 receives read and write commands from a host over a primary data interface 512 and translates such commands into corresponding control signals conveyed to respective storage locations via the Flash interface buses 504a, 504b.

In addition to the primary data interface 512, the SSD 500 includes side-channels 514, 516 that serve as independent channels usable to control media recording electronics. Each of the side channels 514, 516 is usable to convey a selectively-asserted signal that functions as a controller-override mechanism. In FIG. 5, a first one of the side-channels 514 is used to convey a "Safeguard User Data" signal that, when asserted, provides a "Write Protect" signal to all of the NAND flash chips on the device. This signal causes the NAND chips to prevent block erasure and programming from occurring within the components. Since this write-protection occurs on a channel completely unknown to and inaccessible by the drive access controller 502, assertion of the Safeguard User Data signal has the effect of preventing the drive storage controller 502 from reading from or writing to the NAND chips while the Safeguard User Data signal is asserted.

A second one of the side-channels 516 serves as a write protection mechanism usable to convey a "Write Protect" signal for the SSD's firmware that, when selectively asserted, prevents firmware within the secondary non-volatile memory 510 from being modified. According to one implementation, the SSD 500 is integrated within a storage system that asserts the Write Protect signal during most or all nominal storage operations, and un-asserts the signal at times when the firmware is being intentionally updated.

Figure 6:
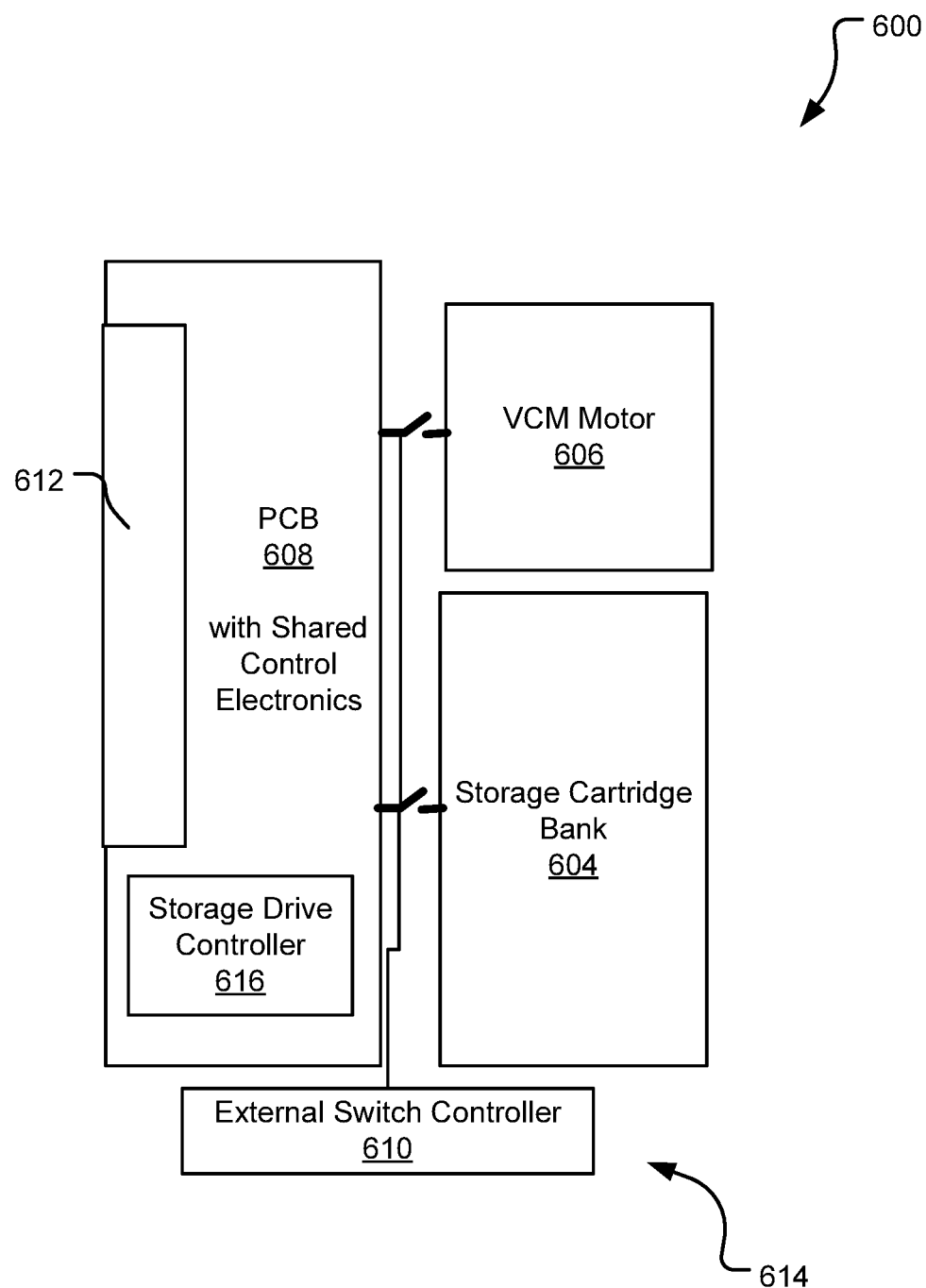
FIG. 6 illustrates another exemplary storage device with various controller-override mechanisms designed to safeguard user data from actions potentially implemented by a drive storage controller that has been victim to a malware attack.

FIG. 6 illustrates another exemplary storage device 600 with a controller-override mechanism 614 that may be selectably activated by a user to isolate user data and thereby protect the user data from alteration by a drive storage controller 616 at select times, such as when it is suspected or known that the drive storage controller 616 has been the victim of a malware attack. For example, the controller-override mechanism 614 may be selectively activated for a period of time in which firmware within the drive storage controller 616 is re-loaded following a ransomware attack.

The illustrated storage device 600 includes a storage cartridge bank 604 (or deck) including a number of different storage cartridges that may have characteristics the same or similar to those described with respect to the storage cartridges of FIG. 3. The storage cartridges in the storage cartridge bank 604 lack individual read/write control electronics and instead share control electronics integrated on the PCB 608. One or more storage cartridges are loaded into storage cartridge bank 604 via one or more robotic motors 602 where they are coupled to shared control electronics 608. These shared control electronics execute read and write commands targeting the various drives in the storage cartridge bank 604 responsive to receiving such commands over a host interface 612. In one implementation, the PCB 608 supports a shared storage drive controller operable to read from and write to all loaded drives in the storage cartridge bank 604 and additionally supports both volatile memory and secondary non-volatile memory (e.g., storing firmware) used by the drive storage controller to carry out read and write operations.

The storage device 600 additionally includes a controller-override mechanism 614 that includes an external switch controller 610. To activate the controller-override mechanism 614, a user manually or electrically alters a state of the external switch controller 610, breaking a physical and/or electrical connection between the storage cartridge bank 604 and VCM motors 606 and the PCB 608. For example, a user may activate the controller-override mechanism 614 by turning a knob, inserting a key, or pressing a button on a physical interface of the storage device 600. Alternatively, the user may activate the controller-override mechanism 614 by inputting an electrical signal to the storage device 600, such as by coupling a handheld mobile device to a side-channel electrical interface of the storage device 600 and by using the mobile device to generate a safeguard user data signal that causes the external switch controller 610 to break the physical and/or electrical connection between the storage cartridge bank 604 and the PCB 608. In one implementation, a user slides a dielectric sheet into an interface between the PCB 608 and the storage cartridge bank 604 to activate the controller-override mechanism 614.

Within the storage device 600, the electrical and/or physical separation between the PCB 608 and the storage cartridge bank 604 may be achieved in a variety of different ways. In one implementation, the external switch controller 610 opens one or more electrical switches coupling the PCB 608 to the storage cartridge bank 604. In another implementation, the external switch controller 610 applies a force that physically "pushes" the storage cartridge bank 604 away from the PCB 608, temporarily breaking the electrical coupling between the two. In either scenario, electrical connections between the PCB 608 and the storage cartridge bank 604 are temporarily severed in a manner that prevents the shared control electronics on the PCB 608 from carrying out read and write operations to the cartridges within the storage cartridge bank 604 until such time that the severed connections are re-established, such as when a user performed a second manual action to return the external switch controller 610 to its original state.

Figure 7:
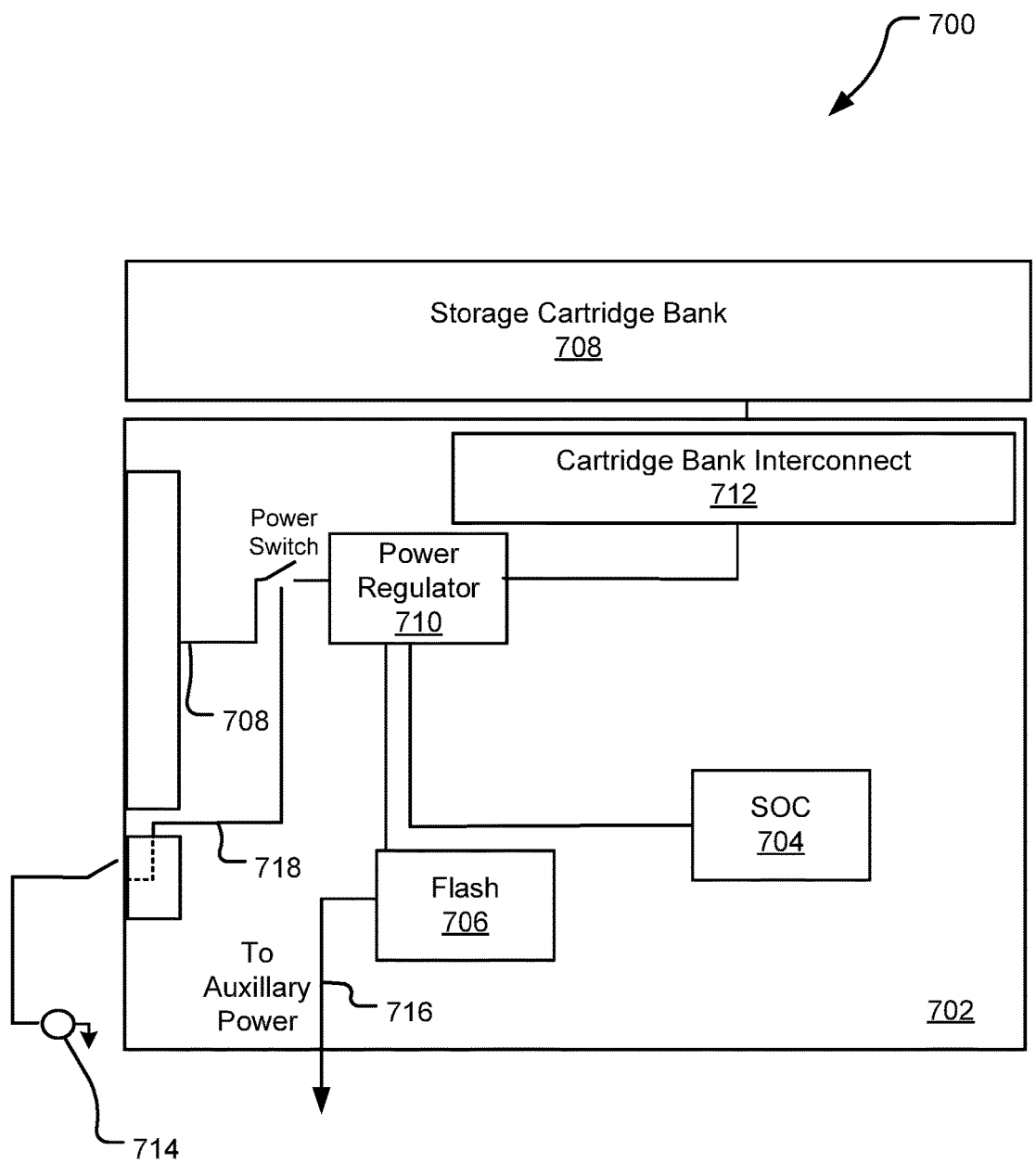
FIG. 7 illustrates still another exemplary storage device with a controller-override mechanism assertable to isolate and thereby protect user data from alteration by control electronics internal to the storage device.

FIG. 7 illustrates still another exemplary storage device 700 with a controller-override mechanism 714 assertable to isolate and thereby protect user data from alteration by control electronics internal to the storage device 700, such as a system-on-chip (SOC 704) executing firmware stored in flash 706. Like the storage devices of FIGS. 3 and 5, the storage device 700 includes a PCB 702 that supports control electronics (e.g., a power regulator 710, flash memory 706, and the SOC 704) that are shared by multiple independently-selectable storage media in a storage cartridge bank 708. In FIG. 7, both power and data signals are transmitted across a cartridge bank interconnect 712. For simplicity, the connection lines shown in FIG. 7 exclusively illustrate power flows. Data flows (e.g., SATA, I2C, or other protocols) are not illustrated.

In the illustrated embodiment the controller-override mechanism 714 is a manually or electrically enabled and disabled switch asserted along a transmission line 718 that is effective to disrupt and short out a power input 708 to a power regulator 710 that feeds all control electronics on the PCB 702. For example, the power input 708 may be a power supply provided by a SATA bus from a host (not shown). When the controller-override mechanism 714 is switched into a state that disrupts the power input 708, all power is cut to the SOC 704 and the storage cartridge bank 708. Consequently, the SOC can no longer execute firmware commands stored in the flash 706 that are requisite for carrying out read and write operations to the storage cartridge bank 708. However, due to the existence of an auxiliary power input line 716, the flash 706 remains powered on and may be re-programmed (updated) using an external flash interface, such as an I2C bus (not shown) while the SOC is offline.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A data storage device comprising:
a primary storage media;
a drive storage controller electrically coupled to media recording electronics; and
a controller-override mechanism selectively activatable by a user action at a time when the data storage device is otherwise configured for nominal data storage operations, the user action triggering an action of the controller-override mechanism that prevents the drive storage controller from altering the primary storage media.

2. The data storage device of claim 1, wherein the controller-override mechanism interrupts an electrical connection between the media recording electronics and the primary storage media when activated.

3. The data storage device of claim 1, wherein the controller-override mechanism is configured to control a voice coil motor to forcibly park one or more recording heads when activated, the forcible parking of the one or more recording heads preventing the drive storage controller from writing to the primary storage media.

4. The data storage device of claim 1, wherein the controller-override mechanism is configured to power down a spindle motor and a preamplifier of the data storage device when activated, the powering down of the spindle motor and the preamplifier preventing the drive storage controller from writing to the primary storage media.

5. The data storage device of claim 1, wherein the user action is a manual action at a physical location of the data storage device that activates the controller-override mechanism.

6. The data storage device of claim 1, further comprising:
a write protection mechanism selectively triggered by the user action to prevent modification of firmware stored on a secondary storage media within the data storage device.

7. The data storage device of claim 1, wherein the data storage device further includes:
multiple independently-selectable storage cartridges coupled to shared read/write control electronics, the controller-override mechanism being configured to interrupt one or more communication channels between the shared read/write control electronics and the multiple independently-selectable storage cartridges.

8. A method comprising:
receiving an indication that device firmware has been compromised in a malware attack; and
responsive to receipt of the indication, selectively activating a controller-override mechanism of a data storage device at a time when the data storage device is otherwise configured for nominal data storage operations, the controller-override mechanism being selectively activated by a user action to override control actions of a drive storage controller within the data storage device, the user action triggering an action of the controller-override mechanism that prevents the drive storage controller from altering data on a primary storage media of the data storage device.

9. The method of claim 8, wherein controller-override mechanism is configured to: interrupt an electrical connection between media recording electronics and the primary storage media.

10. The method of claim 8, wherein the controller-override mechanism is configured to:
assert a signal that controls a voice coil motor to forcibly park one or more recording heads.

11. The method of claim 8, wherein the controller-override mechanism is configured to:
turn off power to a spindle motor of the data storage device.

12. The method of claim 8, wherein the controller-override mechanism is configured to:
turn off power to one or more preamplifiers within the data storage device.

13. The method of claim 8, further comprising:
selectively activating a write protection mechanism to prevent modification of firmware stored on a secondary storage media within the data storage device.

14. The method of claim 8, wherein selectively activating the controller-override mechanism further comprises:
interrupting one or more communication channels between a shared set of read/write control electronics and multiple independently-selectable storage cartridges.

15. A data storage system comprising:
a plurality of storage drives each including a drive storage controller including control electronics to read data from and write data to a primary storage media, each of the plurality of storage drives including a controller-override mechanism selectably activatable by a user action that triggers one or more override control actions of the drive storage controller, the one or more override control actions preventing the drive storage controller from altering the primary storage media at a time when the data storage device is otherwise configured for nominal data storage operations; and a side channel network including a plurality of transmission channels, the plurality of transmission channels configured to transmit signals effective to selectively activate the controller-override mechanism within each one of the plurality of storage drives.

16. The data storage system of claim 15, wherein activation of the controller-override mechanism within each of the plurality of storage drives interrupts an electrical connection between media recording electronics and the primary storage media.

17. The data storage system of claim 15, wherein activation of the controller-override mechanism within each of the plurality of storage drives controls a voice coil motor to forcibly park one or more recording heads, the forcible parking of the one or more recording heads preventing the drive storage controller from writing to the primary storage media.

18. The data storage system of claim 15, wherein activation of the controller-override mechanism within each of the plurality of storage drives powers down a spindle motor of the data storage system, the powering down of the spindle motor preventing the drive storage controller from writing to the primary storage media.

19. The data storage system of claim 15, wherein activation of the controller-override mechanism within each of the plurality of storage drive powers down a preamplifier within each of the plurality of storage drives.

20. The data storage system of claim 15, wherein each one of the plurality of drives further includes:

a write protection mechanism that selectively asserts a signal effective to prevent modification of firmware stored on a secondary storage media within each of the plurality of drives.

* * * * *